US008200217B2

(12) United States Patent
Kanade et al.

(10) Patent No.: US 8,200,217 B2
(45) Date of Patent: Jun. 12, 2012

(54) METHOD AND APPARATUS FOR CHANNEL SCANNING THAT IMPROVES ACQUISITION PROBABILITY AND POWER CONSUMPTION

(75) Inventors: Parag Mohan Kanade, San Diego, CA (US); Alex K. Tu, San Diego, CA (US); Virat Deepak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 543 days.

(21) Appl. No.: 12/126,844

(22) Filed: May 23, 2008

(65) Prior Publication Data

US 2009/0291683 A1 Nov. 26, 2009

(51) Int. Cl.
*H04Q 7/20* (2006.01)
(52) U.S. Cl. ..................... 455/434; 455/435.3
(58) Field of Classification Search .................. 455/434, 455/435.3
See application file for complete search history.

(56) References Cited

U.S. PATENT DOCUMENTS

| 5,794,146 | A | 8/1998 | Sevcik et al. | |
|---|---|---|---|---|
| 2001/0053710 | A1 | 12/2001 | Gibbons et al. | |
| 2004/0063427 | A1* | 4/2004 | Narasimha et al. | 455/434 |
| 2004/0077383 | A1 | 4/2004 | Lappetelainen et al. | |
| 2004/0192328 | A1* | 9/2004 | Giacalone et al. | 455/455 |
| 2004/0235475 | A1* | 11/2004 | Ishii | 455/435.3 |
| 2004/0266386 | A1 | 12/2004 | Kuo | |
| 2005/0060319 | A1 | 3/2005 | Douglas et al. | |
| 2006/0079224 | A1* | 4/2006 | Welnick et al. | 455/432.1 |
| 2006/0119508 | A1 | 6/2006 | Miller | |
| 2009/0291663 | A1 | 11/2009 | Schultz et al. | |
| 2009/0291683 | A1* | 11/2009 | Kanade et al. | 455/434 |
| 2010/0009643 | A1 | 1/2010 | Haartsen | |
| 2010/0311473 | A1 | 12/2010 | Deshpande et al. | |

FOREIGN PATENT DOCUMENTS

| WO | WO2006093882 | 9/2006 |
|---|---|---|
| WO | WO2008052123 | 5/2008 |

OTHER PUBLICATIONS

International Search Report and Written Opinion -PCT/US2009/044574, International Search Authority—European Patent Office—Sep. 23, 2009.

* cited by examiner

*Primary Examiner* — Charles Shedrick
(74) *Attorney, Agent, or Firm* — Kenneth K. Vu; Won Tae Kim (57) ABSTRACT

A method and apparatus for channel acquisition using a mobile station include obtaining geographic information of at least one wireless communication systems using one or more systems, respectively. The one or more channels are prioritized on a preferred roaming list based on the geographic information, and it is determined whether any of the prioritized one or more channels on the preferred roaming list are also on a most recently used (MRU) list. The mobile station attempts to acquire at least one of the prioritized one or more channels that is also on the MRU list.

30 Claims, 8 Drawing Sheets

METHOD AND APPARATUS FOR CHANNEL SCANNING THAT IMPROVES ACQUISITION PROBABILITY AND POWER CONSUMPTION

REFERENCE TO CO-PENDING APPLICATIONS FOR PATENT

Reference is made to co-pending application Ser. No. 12/126,840, entitled "METHOD AND APPARATUS FOR CHANNEL ACQUISITION WHILE MAINTAINING A DEFINED BATTERY LIFE SPAN", with the same inventors as the present application and filed concurrently herewith, and which is expressly incorporated herein by reference.

BACKGROUND

1. Field

The present disclosure relates generally to wireless communication, and more specifically to method and apparatus for channel scanning in wireless communication systems.

2. Background

Battery performance of a mobile device depends on the amount of time spent in different operational modes. For example, typical mobile device operation modes include traffic states (i.e., voice and data transmissions) and idle states, which may occur while the mobile devices are in-service or out of service.

When a mobile device loses service, significant power is consumed during the re-acquisition of service. Re-acquisition may require multiple attempts to use multiple channels/frequencies/bands, which may or may not be usable. Depending on a power level remaining in a battery of the mobile device, the mobile device may not locate a usable system before the battery dies.

Searching for unusable or "dead" channels is costly, both with respect to time and power consumption. Searching for dead channels delays the acquisition of live channels and at the same time wastes battery power during the search.

Conventional out-of-service algorithms are dependent on channel conditions which lead to unpredictable battery power performance, since time and power may be wasted attempting to acquire service via dead channels. Unpredictable standby time leads to user dissatisfaction due to unpredictable power consumption and battery life spans.

Therefore, there is a need in the art for method and apparatus for channel scanning that improves acquisition probability with efficient power consumption, without wasting time and battery power searching for "dead" channels.

SUMMARY

The presently disclosed embodiments are directed to solving one or more of the problems presented in the prior art, described above, as well as providing additional features that will become readily apparent by reference to the following detailed description when taken in conjunction with the accompanying drawings.

One aspect of the disclosure is directed to a method for system acquisition using a mobile station. The method includes obtaining geographic information of at least one wireless communication system using one or more channels, respectively; prioritizing, on a roaming list, the one or more channels based on the geographic information; determining which of the prioritized one or more channels on the roaming list are on a most recently used (MRU) list; and attempting to acquire a system using at least one of the prioritized one or more channels that is on the MRU list.

Another aspect of the disclosure is directed to an apparatus for system acquisition using a mobile station. The apparatus includes a processing unit that is configured to obtain geographic information of at least one wireless communication system using one or more channels, respectively; prioritize, on a roaming list, the one or more channels based on the geographic information; determine which of the prioritized one or more channels on the roaming list are on a most recently used (MRU) list; and attempt to acquire a system using at least one of the prioritized one or more channels that is on the MRU list.

Yet another aspect of the disclosure is directed to an apparatus for system acquisition using a mobile station. The apparatus includes means for obtaining geographic information of at least one wireless communication system using one or more channels, respectively; means for prioritizing, on a roaming list, the one or more channels based on the geographic information; means for determining which of the prioritized one or more channels on the roaming list are on a most recently used (MRU) list; and means for attempting to acquire a system using at least one of the prioritized one or more channels that is on the MRU list.

Yet another aspect of the disclosure is directed to a machine-readable medium storing instructions thereon for performing a method of system acquisition using a mobile station. The method includes obtaining geographic information of at least one wireless communication system using one or more channels, respectively; prioritizing, on a roaming list, the one or more channels based on the geographic information; determining which of the prioritized one or more channels on the roaming list are on a most recently used (MRU) list; and attempting to acquire a system using at least one of the prioritized one or more channels that is on the MRU list.

Yet another aspect of the disclosure is directed to a processor configured to execute instructions for system acquisition using a mobile station. The instructions include obtaining geographic information of at least one wireless communication system using one or more channels, respectively; prioritizing, on a roaming list, the one or more channels based on the geographic information; determining which of the prioritized one or more channels on the roaming list are on a most recently used (MRU) list; and attempting to acquire a system using at least one of the prioritized one or more channels that is on the MRU list.

By filtering results of system measurements based on geographic information and the MRU list, false positives will be reduced in the system measurement results. That is, the mobile device is less likely to waste time or battery power attempting to acquire a system that is dead, since priority will be given to systems that are within a desired geographic location and have been recently used by the mobile station.

It is to be understood that both the foregoing general description and the following detailed description are exemplary and are intended to provide further explanation of the claimed subject matter.

BRIEF DESCRIPTION OF THE DRAWINGS

The features, nature and advantages of the present disclosure will become more apparent from the detailed description set forth below when taken in conjunction with the drawings in which like reference characters identify correspondingly throughout and wherein.

DETAILED DESCRIPTION

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in detail so as not to obscure the subject technology.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Figure 1:
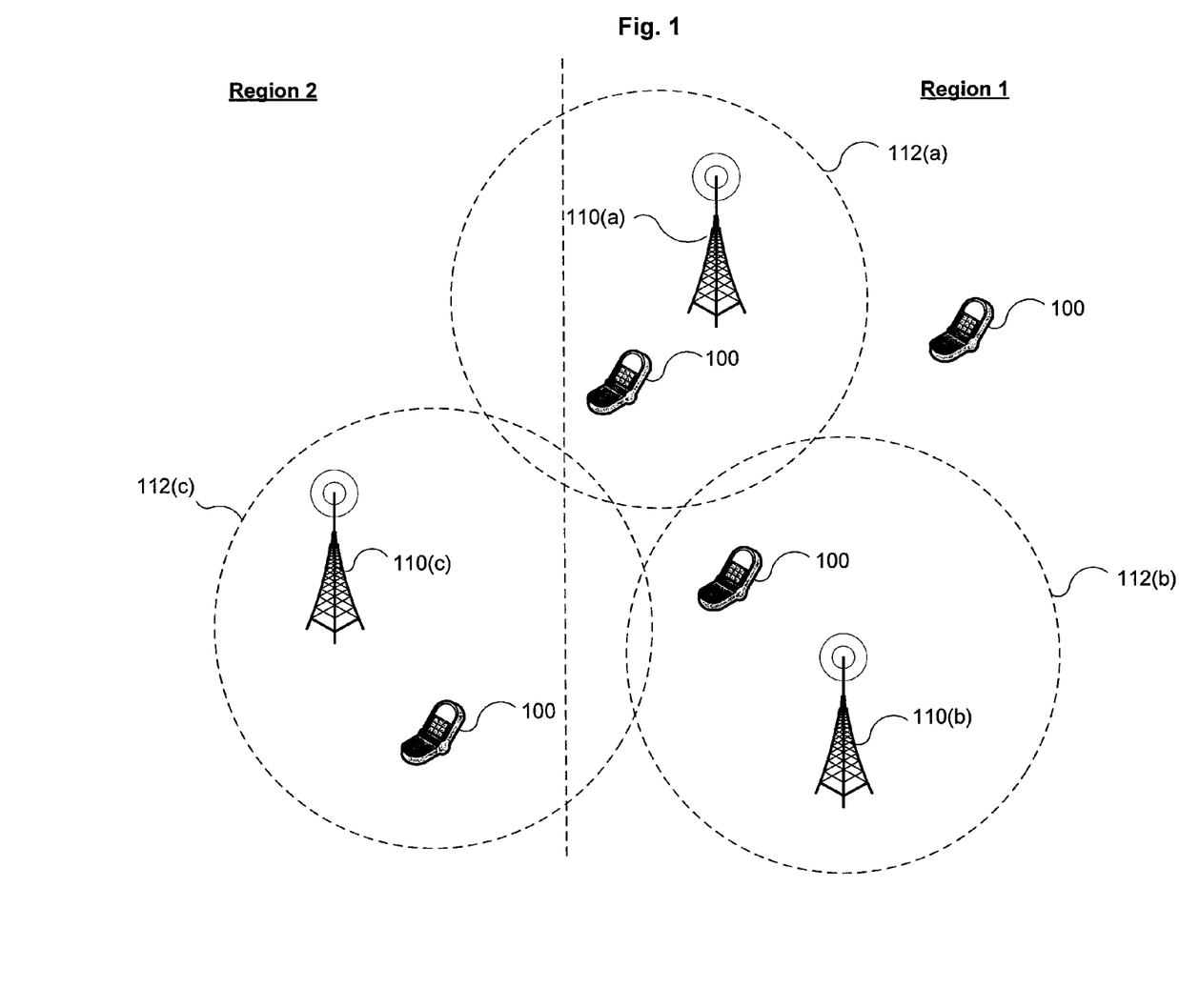
FIG. 1 is a schematic of mobile stations acquiring service from various wireless systems, according to certain aspects of the present disclosure.

FIG. 1 is a schematic of a plurality of mobile stations acquiring service from various wireless systems, according to certain aspects of the present disclosure. As depicted in FIG. 1, mobile stations 100 acquire service from one of the wireless communication systems 110(a)-110(c), when within respective coverage areas 112(a)-112(c). A mobile station 100 may move in and out of coverage areas 112(a)-112(c), thereby losing service to the wireless communication system 110(a)-110(c) from which the mobile station 100 leaves and must then acquire service via a channel utilized by a wireless communication system 110(a)-110(c) whose respective coverage area 112(a)-112(c) the mobile station 100 enters.

Wireless communication systems 110(a)-110(c) may be grouped within geographic Region 1 and Region 2, for example, where Region 1 and Region 2 are predefined and stored within the mobile stations 100 or determined by each mobile station 100 on an individual bases. In the example shown in FIG. 1, wireless communication systems 110(a) and 110(b) are in Region 1, and wireless communication system 110(c) is in Region 2. According to this example, the wireless communication systems are grouped based on transmitter locations; however, the wireless communication systems may be grouped based on coverage areas 112(a)-112(c) without departing from the scope of the present disclosure. Only Regions 1 and 2 are shown in FIG. 1; however, any number of regions including any number of wireless communication systems 110(a)-110(c) may exist.

Mobile stations 100 may refer to, for example, cellular phones, PDAs or the like, and may also be called mobile devices, user equipment (UE), wireless communication devices, terminals, stations, or some other terminology.

Figure 2:
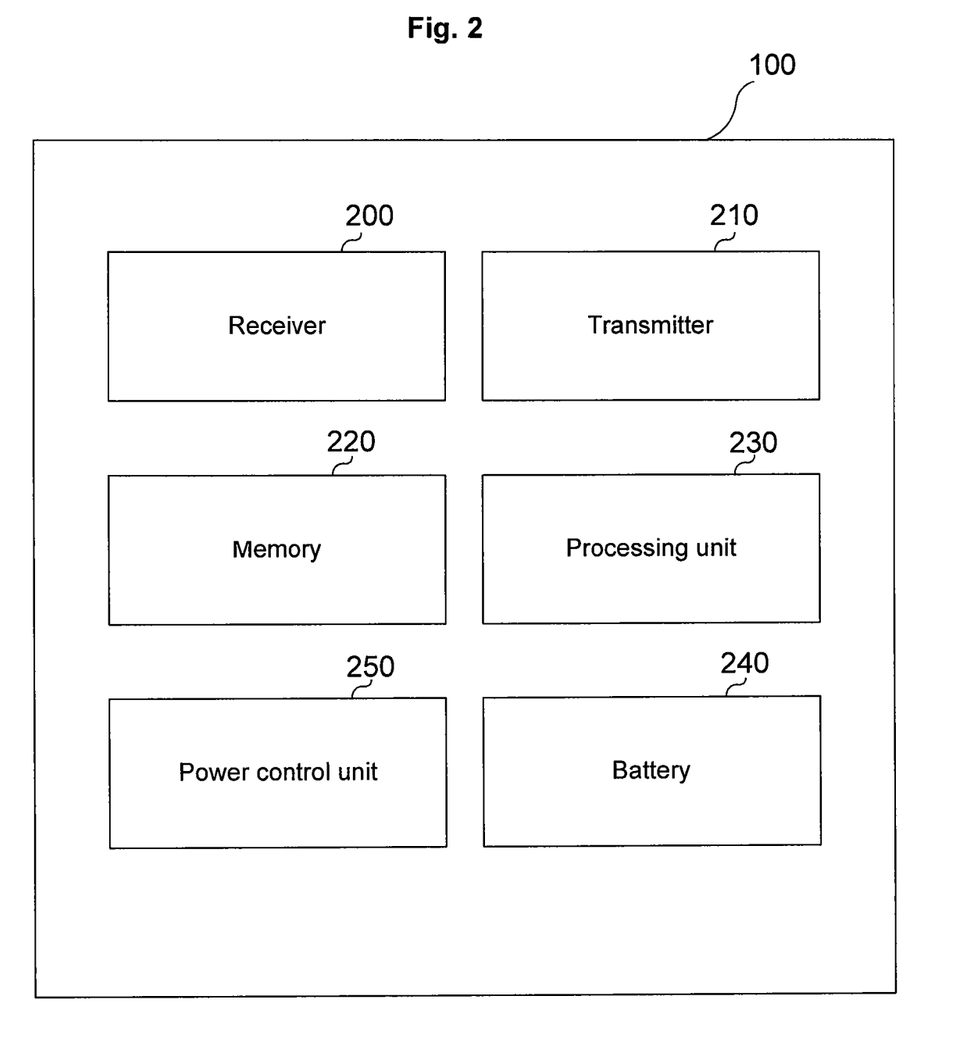
FIG. 2 is an exemplary diagram of a mobile station, according to certain aspects of the present disclosure.

FIG. 2 is an exemplary diagram of a mobile station 100, according to certain aspects of the present disclosure. According to certain aspects, mobile station 100 includes a receiver 200 and a transmitter 210. The mobile station 100 further includes a memory 220, a processing unit 230, a battery 240 and a power control unit 250. Of course, the mobile station 100 is not limited to any particular configuration, and various combinations of components, as well as other components, may be included in the mobile station 100.

Figure 3:
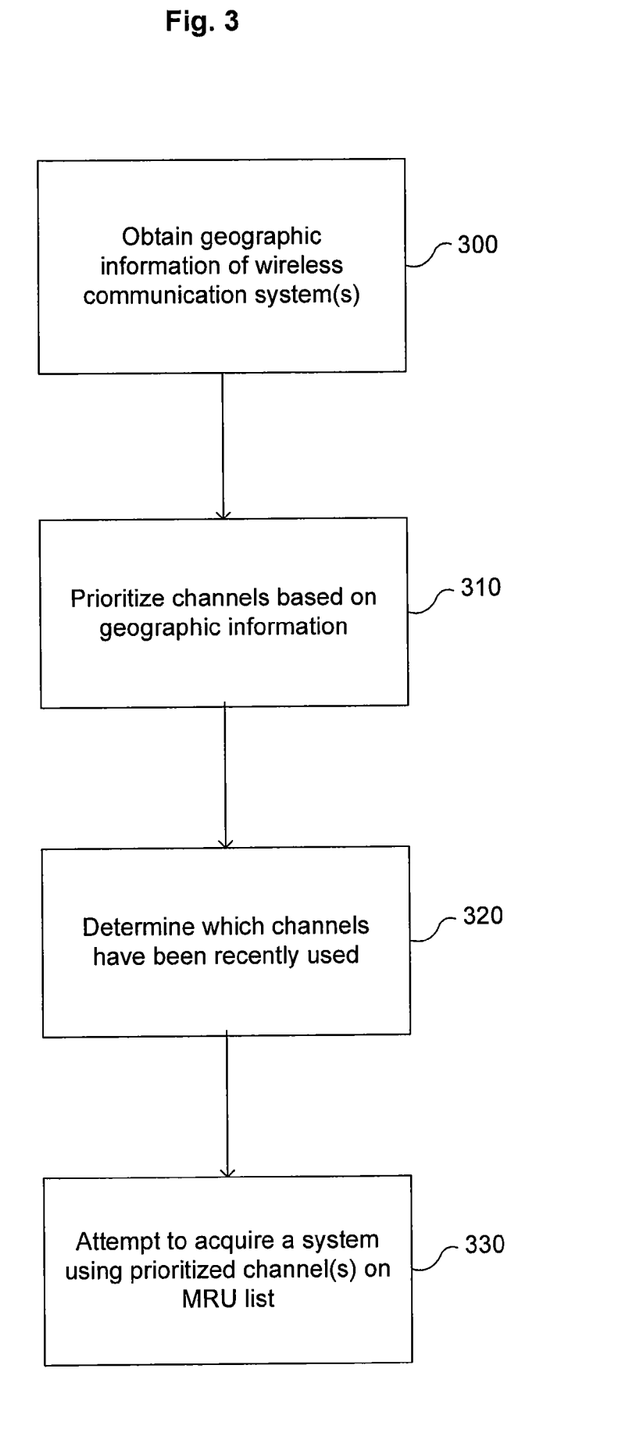
FIG. 3 is a flow diagram illustrating a method of system acquisition at a mobile station, according to certain aspects of the present disclosure.

FIG. 3 is a flow diagram illustrating a method of system acquisition at a mobile station 100, according to certain aspects of the present disclosure. Referring now to FIG. 3, at operation 300, the mobile station 100 obtains geographic information of wireless communication system(s) 110(a)-110(c). Geographic information of wireless communication systems 110(a)-110(c) may be pre-programmed into the memory 220 of mobile station 100, and associated with channels employed by respective wireless communication systems 110(a)-110(c). The geographic information may include, for example, location information of the wireless communication systems 110(a)-110(c). The geographic information may include defined regions in which wireless communication systems 110(a)-110(c) may be found. Of course, any other geographic information may be included without departing from the scope of the present disclosure. The geographic information can also dynamically obtained rather than pre-programmed.

From operation 300, the process proceeds to operation 310, where channels used by respective wireless communication systems 110(a)-110(c) are prioritized based on the corresponding geographic information obtained from the memory 220 of the mobile station 100. The channels are prioritized by processing unit 230 on a roaming list (further described with reference to FIGS. 4(a) and 4(b) below) stored in memory 220. According to certain aspects, the roaming list may be a preferred roaming list pre-programmed in the memory 220. For example, channels used by wireless communication systems 110(a)-110(c) that are closer to the mobile station 100 than other of the wireless communication systems 110(a)-110(c) may be prioritized higher on the preferred roaming list. Channels may be prioritized based on other geographic information without departing from the scope of the present disclosure.

From operation 310, the process proceeds to operation 320 where the mobile station 100 determines which of the prioritized channels on the preferred roaming list have been recently used by the mobile device 100. The memory 220 of the mobile station 100 stores a most recently used (MRU) list (further described with reference to FIGS. 5(a) and 5(b) below), which records the channels that the mobile device 100 has most recently used to obtain service.

From operation 320, the process proceeds to operation 330, where the mobile station 100 attempts to acquire one or more of the prioritized channels that also have been recently used. For example, processing unit 230 may filter the results of the prioritizing at operation 310 with the channels on the MRU list. Then, the mobile device 100 will attempt to acquire channels that were prioritized at operation 310 and that appear on the MRU list. Hence, the mobile stations 100 employ both geographic information and usage activity to determine which channels to attempt to acquire, according to certain disclosed embodiments.

Figure 4A:
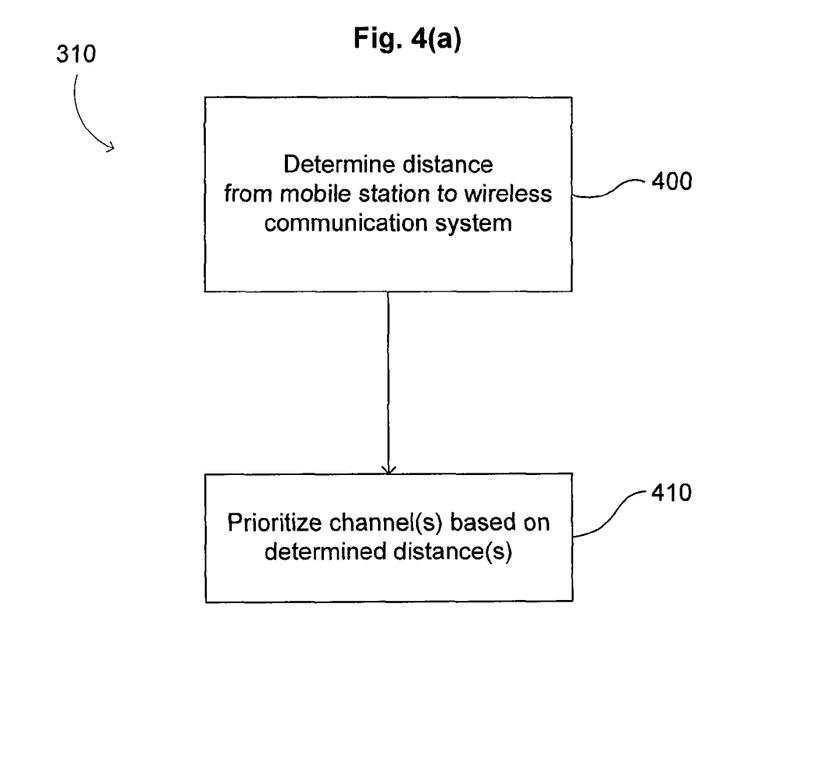
FIGS. 4(a) and 4(b) are flow diagrams illustrating a method of prioritizing, on a preferred roaming list, one or more channels based on geographic information, according to certain aspects of the present disclosure.
Figure 4B:
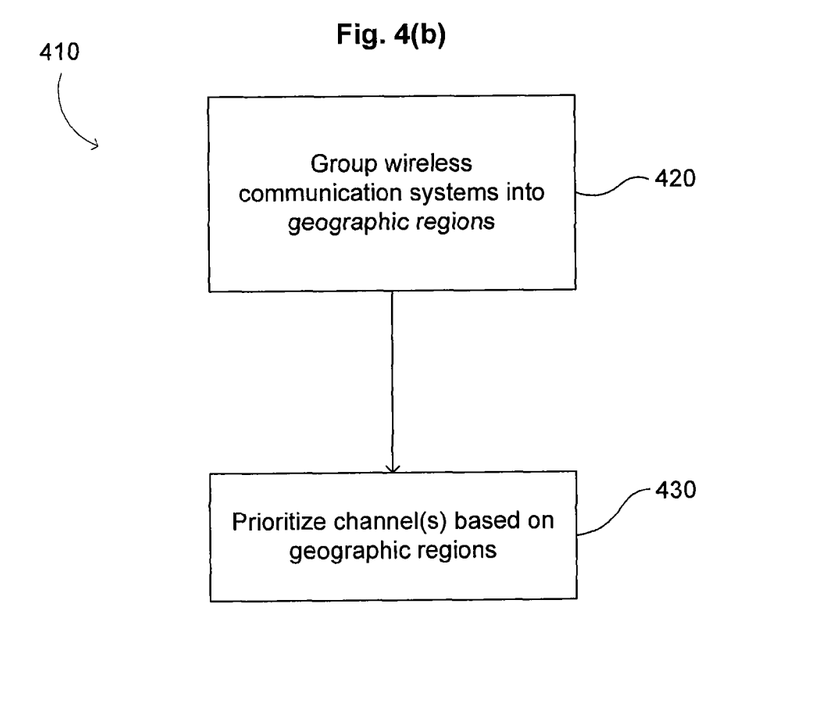

FIGS. 4(*a*) and 4(*b*) are flow diagrams illustrating a method of prioritizing (as described at operation 310), on a preferred roaming list, one or more channels based on geographic information, according to certain aspects of the present disclosure. Referring to FIG. 4(*a*), at operation 400 distances may be determined from the mobile station 100 to one or more wireless communication systems 110(*a*)-110(*c*). As noted above, locations of the wireless communication systems 110(*a*)-110(*c*) may be pre-programmed into the MRU list stored in the memory 220. The current location of the mobile station 100 may be determined using a GPS navigation systems, for example, or any conventional positioning mechanism. Once the location of the wireless communication system(s) 110(*a*)-110(*c*) and the location of the mobile station 100 are determined the distances may be calculated by the processing unit 230, for example.

From operation 400, the process proceeds to operation 410 where the channels are prioritized in the preferred roaming list stored in the memory 220 based on the determined distance(s). For example, channels employed by wireless communication systems 110(*a*)-110(*c*) that are closer to the mobile station 100 may be given a higher priority on the preferred roaming list.

FIG. 4(*b*) is a flow diagram illustrating an exemplary prioritizing operation 310, according to certain aspects of the present disclosure. At operation 420, the wireless communication systems 110(*a*)-110(*c*) are grouped into geographic regions. Referring back to FIG. 1, wireless communication system 110(*a*) and 110(*b*) may be grouped into one region, while wireless communication system 110(*c*) may be grouped into a second region. Of course, any number of systems 110(*a*)-110(*c*) may be in each region, and any number of regions may exist. The geographic regions may be pre-programmed into the memory 220. Alternatively, the geographic regions may be determined based on the distances from the mobile station 100 determined at operation 400. That is, wireless communication systems 110(*a*)-110(*c*) located at similar distances from the mobile station 100 may be grouped in a geographic region.

From operation 420, the process proceeds to operation 430, where the channels are prioritized on the preferred roaming list based on the geographic regions. Channels employed by wireless communication systems 110(*a*)-110(*c*) in respective geographic regions are grouped together and prioritized based on the respective geographic region. For example, channels employed by wireless communication systems 110(*a*)-110(*c*) closest to the mobile station 100 are prioritized higher on the preferred roaming list.

Figure 5A:
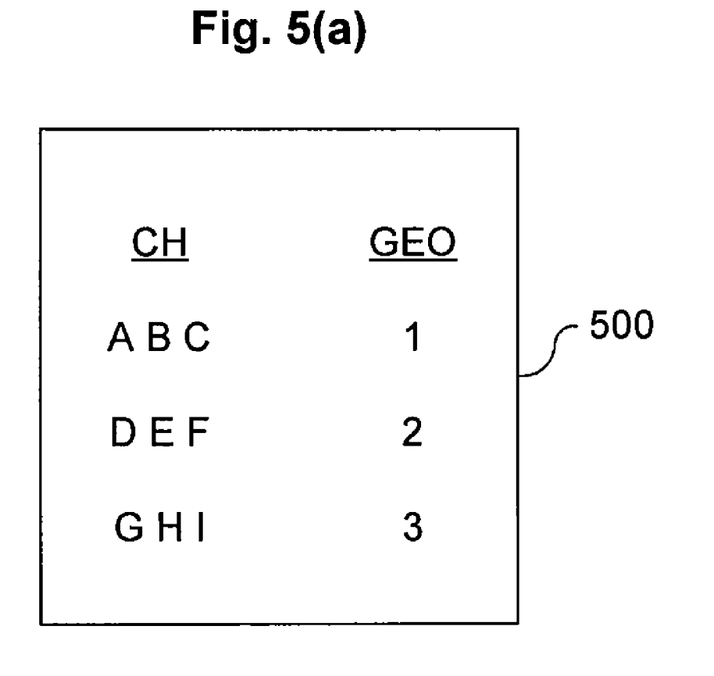
FIGS. 5(a) and 5(b) are an exemplary preferred roaming list and an exemplary most recently used (MRU) list, respectively, according to certain aspects of the present disclosure.
Figure 5B:
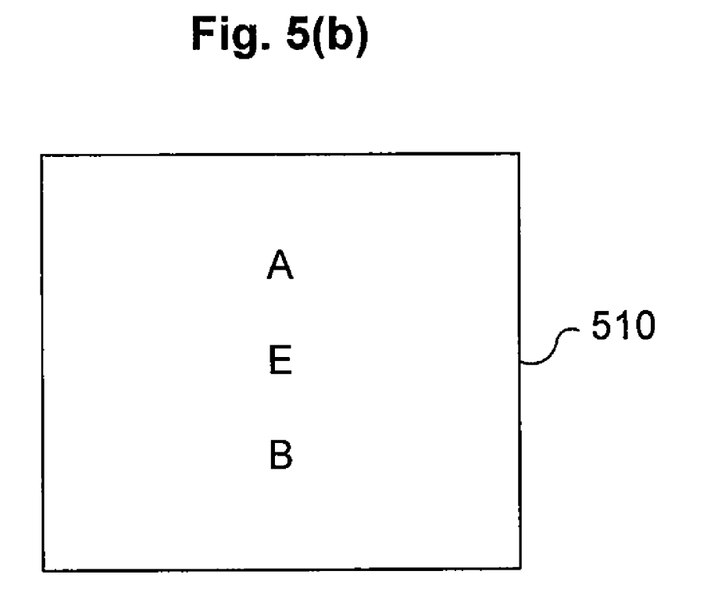

FIGS. 5(*a*) and 5(*b*) are an exemplary preferred roaming list and an exemplary MRU list, respectively, according to certain aspects of the present disclosure. As shown in FIG. 5(*a*) preferred roaming list 500 includes channels A, B, C, D, E, F, G, H and I grouped into three geographic regions 1, 2 and 3. In this exemplary preferred roaming list 500, channels A, B and C are given the highest priority, since they are employed by wireless communication systems 110(*a*)-110(*c*) residing within geographic region 1, which may be, for example, the closest geographic region to the mobile station 100. Of course, any number of channels may be on the preferred roaming list 500, and any number of channels may be associated with any particular geographic region. Similarly, any number of geographic regions may be provided on the preferred roaming list 500.

FIG. 5(*b*) is an exemplary MRU list 510, which indicates that channels A, E and B have been most recently used by the mobile station 100. Of course, the present disclosure is not limited to recording any particular number of channels on the MRU list 510. According to certain aspects of the present disclosure, since channels A, E and B are associated with desired geographic regions and are on the MRU list 510, acquisition of these channels will be attempted by the mobile station 100.

According to certain aspects of the disclosure, a duty cycle for re-acquisition of service, when the mobile station 100 is in an out-of service state or when a different channel is desired, includes a search time and a sleep time. During the search time, the mobile station 100 searches for a usable channel by implementing a full scan and/or a micro scan. As an example, when the battery 240 is fully charged, the search time of the duty cycle may last for 5 seconds and the sleep time may last for 36 seconds. However, various sleep times and search times may be used to make up a duty cycle without departing from the scope of the present disclosure. Duty cycles and adjustments thereto are further described in co-pending application Ser. No. 12/126,840, entitled "METHOD AND APPARATUS FOR CHANNEL ACQUISITION WHILE MAINTAINING A DEFINED BATTERY LIFE SPAN", with the same inventors as the present application.

A micro scan is typically a fast scan (e.g., lasting about 10 ms), in which a radio frequency (RF) power of a channel is determined by the power control unit 250 and/or the processing unit 230. Then the processing unit 230 determines whether the RF power of the channel is below a predetermined threshold, and if the RF power of the channel is not below the predetermined threshold the mobile station 100 attempts to acquire service via the channel, using a detailed acquisition of the channel such as a full scan described below.

A full scan is typically a slow scan (e.g., lasting about 300 ms), which generally requires more power than a micro scan. In a full scan, the mobile station 100 attempts to acquire service via one or a plurality of channels, without determining the RF power of the one or a plurality of channels. That is, the processing unit 230 performs a detailed acquisition of the one or a plurality of channels, regardless of the conditions of the channels. As an example, the mobile station 100 may implement a full scan over a limited number of channels (e.g., 5 channels), and then switch to a faster, more power efficient, micro scan for other channels in order to conserve remaining battery power. It is noted that either a micro scan or a full scan may be performed during the entire search time, or a combination thereof may be performed during the search time.

According to the exemplary preferred roaming list 500 and MRU list 510 shown in FIGS. 5(*a*) and 5(*b*), a full scan of channels A, E and B may be performed, as these channels have a high likelihood of being acquired by the mobile station 100, since they have recently been used (i.e., they are on the MRU list 510) and they are within desirable geographic regions provided in the preferred roaming list 500. Of course, a full scan may be performed for any number of channels during a search time. As an alternative, a full scan may be performed on a small number of channels (e.g., only channels A and B) and a micro scan may be performed on any number of remaining channels which may or may not be provided on the MRU list 510.

Figure 6A:
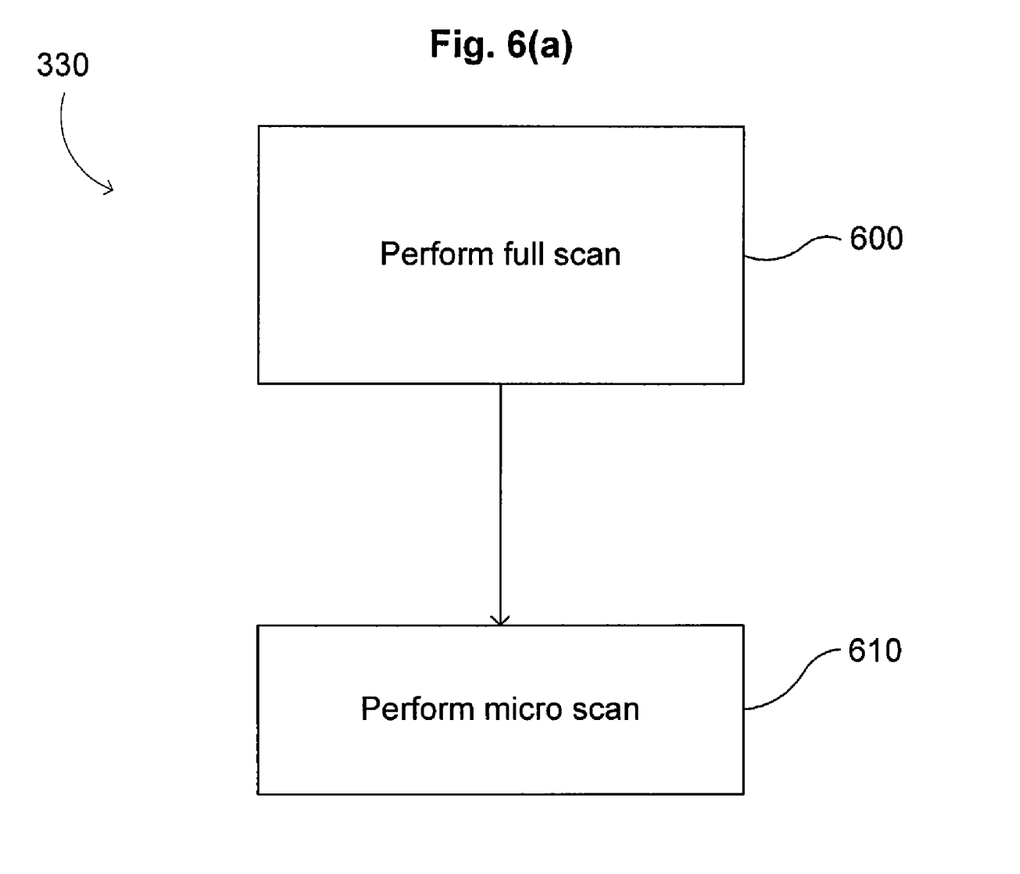
FIGS. 6(a) and 6(b) are flow diagrams illustrating a method of attempting to acquire service using at least one of the prioritized one or more channels that is on the MRU list, according to certain aspects of the present disclosure.

FIGS. 6(*a*) and 6(*b*) are flow diagrams illustrating a method of attempting to acquire service using at least one of the prioritized one or more channels that is on the MRU list (as described at operation 330), according to certain aspects of the present disclosure. Referring to FIG. 6(a), at operation 600, a full scan is performed on one or more channels. As noted above, a full scan may be performed on any number of channels. As one example, a full scan may be performed for the channels that are both prioritized on the preferred roaming list 500 and appear on the MRU list 510. However, it is not necessary that the channels be both prioritized on the preferred roaming list 500 and on the MRU list 510.

According to certain aspects, from operation 600, the process may proceed to operation 610, where a micro scan is performed on one or more channels. As an example, if system acquisition using a full scan is unsuccessful, a micro scan may be performed on the remaining channels on the preferred roaming list 500 in order to conserve power. According to an example, a micro scan may be performed on channels that are prioritized on the preferred roaming list 500, but do not appear on the MRU list 510. However, other options for prioritizing channels may be implemented without departing from the scope of the present disclosure. Further battery power conservation methods are described in co-pending application Ser. No. 12/126,840, entitled "METHOD AND APPARATUS FOR CHANNEL ACQUISITION WHILE MAINTAINING A DEFINED BATTERY LIFE SPAN". Of course, any portion of the search time may be devoted to either full scanning or micro scanning without departing from the scope of the present disclosure.

Figure 6B:
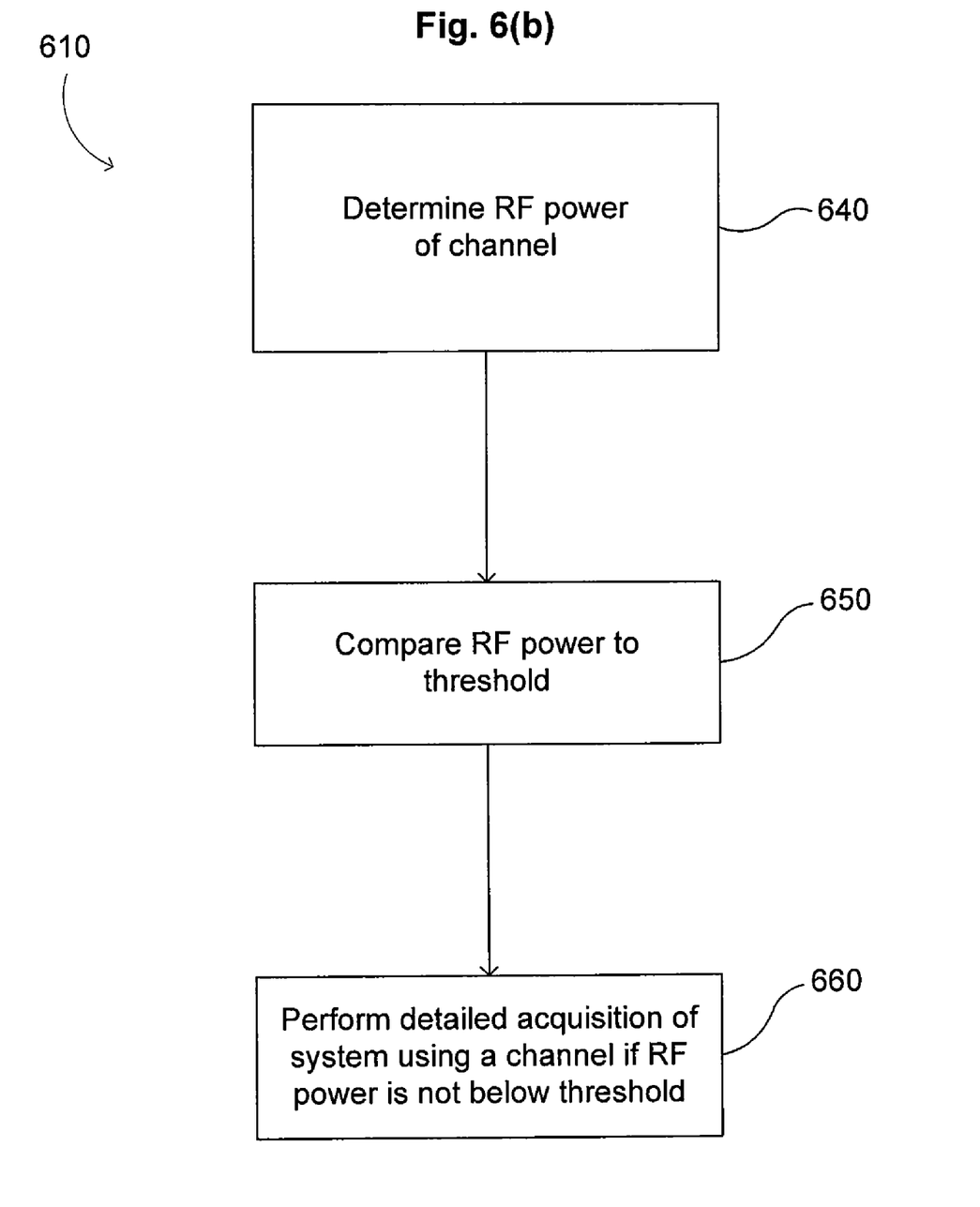

FIG. 6(b) is a flow diagram illustrating a method of performing a micro scan (as described at operation 610), according to certain aspects of the present disclosure. At operation 640, an RF power of a channel is determined by the power control unit 250 and/or the processing unit 230. From operation 640, the process proceeds to operation 650, where the processing unit 230 determines whether the RF power of the channel is below a predetermined threshold.

From operation 650, the process proceeds to operation 660, where, if the RF power of the channel is not below the predetermined threshold, the mobile station 100 attempts to acquire the channel using a detailed acquisition of a system using the channel such as a full scan described above. Of course, any detailed acquisition of the channel may be performed.

Figure 7:
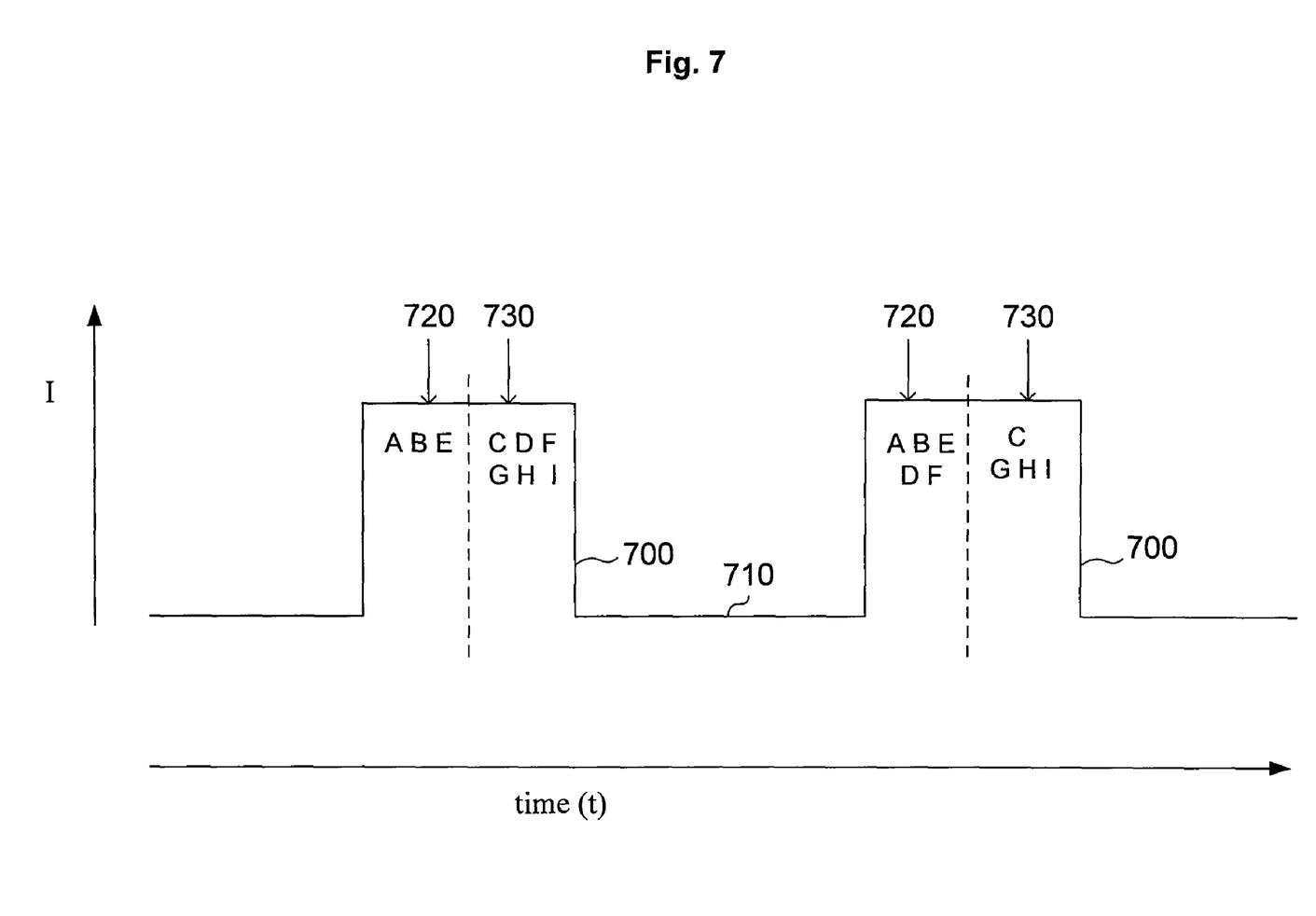
FIG. 7 is a waveform illustrating prioritized channels acquired using a full scan or a micro scan during a search time, according to certain aspects of the present disclosure.

FIG. 7 is a waveform illustrating prioritized channels acquired using a full scan or a micro scan during a search time, according to certain aspects of the present disclosure. As shown in FIG. 7, during search times 700, as part of a duty cycle including a search time 700 and a sleep time 710, a full scan 720 of various channels may be performed and a micro scan 730 of other channels may be performed. Referring to the example described above with referenced to FIGS. 5(a) and 5(b), since channels A, B and E are listed on the MRU list 510 and prioritized on the preferred roaming list 500 (i.e., within geographic Regions 1 and 2), a full scan 720 may be performed for those channels when the mobile station 100 loses service, for example, and desires to re-acquire service. According to certain aspects, full scans may be performed for channels D and F in a subsequent search time 700 because they are of a high priority on the preferred roaming list 500, even though they do not exist on the MRU list 510.

According to certain aspects, a micro scan 730 may be performed for the other channels not subject to a full scan. For example, channels prioritized on the preferred roaming list 500, but not provided on the MRU list 510, may be subject to a micro scan 730. However, any combination or number of channels may be subject to the full scan 720 and/or the micro scan 730 in any particular search time 700.

In addition, as shown in the next search time 700, channels D and F other than the channels A, B and E on the MRU list 510 may be subject to a full scan, since they are within desirable geographic regions provided on the preferred roaming list 500. For example, if acquiring a channel is unsuccessful during the first search time 700, additional full scan may be implemented during the next search time 700. Any number of channels may be subject to the full scan or micro scan, and the number of full scans may be determined based on a remaining battery power level, as described in detail in co-pending application Ser. No. 12/126,840, entitled "METHOD AND APPARATUS FOR CHANNEL ACQUISITION WHILE MAINTAINING A DEFINED BATTERY LIFE SPAN".

By filtering channels prioritized based on geographic information and whether the channels have been recently used by the mobile station 100 (i.e., whether the channels appear on the MRU list 510), false positives will be reduced in the system measurement results. That is, channels which are desirable based on the geographic information are more likely to be acquired if those channel have been previously used by the mobile station 100. The mobile station 100 is less likely to waste time and battery power attempting to acquire a channel that is dead, since priority will be given to channels that are within a desired geographic location and have been recently used by the mobile station.

It is noted that the present disclosure is not limited to the scenario where the mobile station 100 loses service. The features of the present disclosure may be implemented when channel conditions of a currently utilized channel are poor (e.g., the channel conditions fall below a defined threshold) and a different channel with better conditions is desired. Additionally, a user of the mobile station 100 may manually initiate the channel acquisition methods described herein when a different channel is desired.

Those of ordinary skill in the art would understand that the information and signals may be represented using any of a variety of different technologies and techniques. For example, data, instructions, commands information signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical modules, circuits and algorithms described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a filed programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional process, control, microcontroller, or state machine. A process may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the disclosure. Thus, the present disclosure is not intended to be limited to the aspects shown herein but is to be accorded the widest scope consistent with the principles and novel features disclosed herein.

What is claimed is:

1. A method for system acquisition using a mobile station, comprising:
    obtaining geographic information of at least one wireless communication system using one or more channels, respectively, including determining a distance of the at least one wireless communication system from the mobile station;
    prioritizing the one or more channels based on the distance of a corresponding wireless communication system from the mobile station;
    prioritizing, on a roaming list, the one or more channels based on the geographic information;
    determining which of the prioritized one or more channels on the roaming list have been recently used by the mobile station; and
    attempting to acquire a system using at least one of the prioritized one or more channels that also has been recently used.

2. The method of claim 1, the attempting comprising performing a full scan on the at least one of the prioritized one or more channels.

3. The method of claim 2, the attempting comprising performing a micro scan on one or more of the prioritized one or more channels.

4. The method of claim 2, wherein the full scan comprises:
    attempting to acquire service via a channel without determining a radio frequency (RF) power of the channel.

5. The method of claim 3, wherein the micro scan comprises:
    determining a radio frequency (RF) power of a channel;
    determining whether the RF power of the channel is below a predetermined threshold; and
    attempting to acquire service via the channel if the RF power of the channel is not below the predetermined threshold.

6. The method of claim 1, wherein the prioritizing the one or more channels based on the distance comprises:
    grouping a plurality of wireless communication systems into geographic regions based on corresponding geographic information; and
    prioritizing the one or more channels based on the geographic regions of corresponding wireless communication systems.

7. An apparatus for system acquisition using a mobile station, comprising:
    a processing unit configured to:
        obtain geographic information of at least one wireless communication system using one or more channels, respectively, including determining a distance of the at least one wireless communication system from the mobile station;
        prioritize the one or more channels based on the distance of a corresponding wireless communication system from the mobile station;
        prioritize, on a roaming list, the one or more channels based on the geographic information;
        determine which of the prioritized one or more channels on the roaming list have been recently used by the mobile station; and
        attempt to acquire a system using at least one of the prioritized one or more channels that also has been recently used.

8. The apparatus of claim 7, wherein the processing unit is further configured to perform a full scan on the at least one of the prioritized one or more channels.

9. The apparatus of claim 8, wherein the processing unit is further configured to perform a micro scan on one or more of the prioritized one or more channels.

10. The apparatus of claim 8, wherein the full scan comprises:
    attempting to acquire service via a channel without determining a radio frequency (RF) power of the channel.

11. The apparatus of claim 9, wherein the micro scan comprises:
    determining a radio frequency (RF) power of a channel;
    determining whether the RF power of the channel is below a predetermined threshold; and
    attempting to acquire service via the channel if the RF power of the channel is not below the predetermined threshold.

12. The apparatus of claim 7, wherein the processing unit is further configured to:
    group a plurality of wireless communication systems into geographic regions based on corresponding geographic information; and prioritize the one or more channels based on the geographic regions of corresponding wireless communication systems.

13. An apparatus for system acquisition using a mobile station, comprising:
   means for obtaining geographic information of at least one wireless communication system using one or more channels, respectively, including determining a distance of the at least one wireless communication system from the mobile station;
   means for prioritizing the one or more channels based on the distance of a corresponding wireless communication system from the mobile station;
   means for prioritizing, on a roaming list, the one or more channels based on the geographic information;
   means for determining which of the prioritized one or more channels on the roaming list have been recently used by the mobile station; and
   means for attempting to acquire a system using at least one of the prioritized one or more channels that also has been recently used.

14. The apparatus of claim 13, the means for attempting comprising means for performing a full scan on the at least one of the prioritized one or more channels.

15. The apparatus of claim 14, the means for attempting comprising means for performing a micro scan on one or more of the prioritized one or more channels.

16. The apparatus of claim 14, wherein the full scan comprises:
   means for attempting to acquire service via a channel without determining a radio frequency (RF) power of the channel.

17. The apparatus of claim 15, wherein the micro scan comprises:
   means for determining a radio frequency (RF) power of a channel;
   means for determining whether the RF power of the channel is below a predetermined threshold; and
   means for attempting to acquire service via the channel if the RF power of the channel is not below the predetermined threshold.

18. The apparatus of claim 13, further comprising:
   means for grouping a plurality of wireless communication systems into geographic regions based on corresponding geographic information; and
   means for prioritizing the one or more channels based on the geographic regions of corresponding wireless communication systems.

19. A non-transitory machine-readable medium storing instructions thereon for performing a method of system acquisition using a mobile station, comprising:
   obtaining geographic information of at least one wireless communication system using one or more channels, respectively, including determining a distance of the at least one wireless communication system from the mobile station;
   prioritizing the one or more channels based on the distance of a corresponding wireless communication system from the mobile station;
   prioritizing, on a roaming list, the one or more channels based on the geographic information;
   determining which of the prioritized one or more channels on the roaming list have been recently used by the mobile station; and
   attempting to acquire a system using at least one of the prioritized one or more channels that also has been recently used.

20. The non-transitory machine-readable medium of claim 19, the attempting comprising performing a full scan on the at least one of the prioritized one or more channels.

21. The non-transitory machine-readable medium of claim 20, the attempting comprising performing a micro scan on one or more of the prioritized one or more channels.

22. The non-transitory machine-readable medium of claim 20, wherein the full scan comprises:
   attempting to acquire service via a channel without determining a radio frequency (RF) power of the channel.

23. The non-transitory machine-readable medium of claim 21, wherein the micro scan comprises:
   determining a radio frequency (RF) power of a channel;
   determining whether the RF power of the channel is below a predetermined threshold; and
   attempting to acquire service via the channel if the RF power of the channel is not below the predetermined threshold.

24. The non-transitory machine-readable medium of claim 19, further comprising:
   grouping a plurality of wireless communication systems into geographic regions based on corresponding geographic information; and
   prioritizing the one or more channels based on the geographic regions of corresponding wireless communication systems.

25. A processor configured to execute instructions for system acquisition using a mobile station, the instructions comprising:
   obtaining geographic information of at least one wireless communication system using one or more channels, respectively, including determining a distance of the at least one wireless communication system from the mobile station;
   prioritizing the one or more channels based on the distance of a corresponding wireless communication system from the mobile station;
   prioritizing, on a roaming list, the one or more channels based on the geographic information;
   determining which of the prioritized one or more channels on the roaming list have been recently used by the mobile station; and
   attempting to acquire a system using at least one of the prioritized one or more channels that also has been recently used.

26. The processor of claim 25, the attempting comprising performing a full scan on the at least one of the prioritized one or more channels.

27. The processor of claim 26, the attempting comprising performing a micro scan on one or more of the prioritized one or more channels.

28. The processor of claim 26, wherein the full scan comprises:
   attempting to acquire service via a channel without determining a radiofrequency (RF) power of the channel.

29. The processor of claim 27, wherein the micro scan comprises:
   determining a radio frequency (RF) power of a channel;
   determining whether the RF power of the channel is below a predetermined threshold; and
   attempting to acquire service via the channel if the RF power of the channel is not below the predetermined threshold.

30. The processor of claim 25, the instructions further comprising:
grouping a plurality of wireless communication systems into geographic regions based on corresponding geographic information; and
prioritizing the one or more channels based on the geographic regions of corresponding wireless communication systems.

* * * * *